US010899264B2

(12) United States Patent
Jung et al.

(10) Patent No.: US 10,899,264 B2
(45) Date of Patent: Jan. 26, 2021

(54) VACUUM INSULATOR IN A STOREHOUSE AND METHODS OF MAKING AND USING THE SAME

(71) Applicant: LG ELECTRONICS INC., Seoul (KR)

(72) Inventors: Wonyeong Jung, Seoul (KR); Myoungju Kang, Seoul (KR); Deokhyun Youn, Seoul (KR); Sungsub Lee, Seoul (KR); Sora Kim, Seoul (KR); Daewoong Kim, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 15/780,837

(22) PCT Filed: Dec. 7, 2016

(86) PCT No.: PCT/KR2016/014306
§ 371 (c)(1),
(2) Date: Sep. 18, 2018

(87) PCT Pub. No.: WO2017/105030
PCT Pub. Date: Jun. 22, 2017

(65) Prior Publication Data
US 2019/0255980 A1    Aug. 22, 2019

(30) Foreign Application Priority Data

Dec. 15, 2015 (KR) .......................... 10-2015-0179480

(51) Int. Cl.
*B60N 3/10* (2006.01)
*B60R 7/04* (2006.01)
(Continued)

(52) U.S. Cl.
CPC ................ *B60N 3/104* (2013.01); *B60R 7/04* (2013.01); *F25B 21/02* (2013.01); *F25B 21/04* (2013.01);
(Continued)

(58) Field of Classification Search
CPC .......... B60N 3/104; F25B 21/02; F25B 21/04; F25B 2321/023; F25B 2321/025;
(Continued)

(56) References Cited

U.S. PATENT DOCUMENTS 3,823,567 A    7/1974 Corini
4,759,190 A *  7/1988 Trachtenberg ......... B60N 3/103
                                                              62/3.62
(Continued)

FOREIGN PATENT DOCUMENTS

CA    2159620    8/1995
CN    102320424  1/2012
(Continued)

OTHER PUBLICATIONS

Chinese Office Action dated Dec. 4, 2019 issued in Application No. 201680073761.7 (English translation attached).
(Continued)

*Primary Examiner* — Gregory A Blankenship
(74) *Attorney, Agent, or Firm* — KED & Associates LLP

(57) ABSTRACT

Disclosed is a vacuum insulator comprising: a heat diffusion block placed in a third space; a thermoelectric module coming into contact with the heat diffusion block so as to exchange heat therewith, and placed in the third space; and a heat sink exchanging heat with the thermoelectric module and placed in a first space or a second place. According to the present invention, high heat-insulation performance and heat-transfer performance can be obtained.

17 Claims, 18 Drawing Sheets

(51) Int. Cl.
*F25B 21/04* (2006.01)
*F25D 19/00* (2006.01)
*F25D 23/08* (2006.01)
*F25D 23/02* (2006.01)
*F25D 23/06* (2006.01)
*F25B 21/02* (2006.01)

(52) U.S. Cl.
CPC .......... *F25D 19/00* (2013.01); *F25D 19/006* (2013.01); *F25D 23/02* (2013.01); *F25D 23/06* (2013.01); *F25D 23/065* (2013.01); *F25D 23/08* (2013.01); *F25B 2321/023* (2013.01); *F25B 2321/025* (2013.01); *F25D 2201/14* (2013.01)

(58) Field of Classification Search
CPC ........ F25D 19/00; F25D 19/006; F25D 23/02; F25D 23/06; F25D 23/065; F25D 23/08; F25D 2201/14; B60R 7/04
USPC .................................. 296/37.8, 24.34, 24.35
See application file for complete search history.

(56) References Cited

U.S. PATENT DOCUMENTS

| | | | | |
|---|---|---|---|---|
| 5,398,510 | A * | 3/1995 | Gilley | F25B 21/02 62/3.6 |
| 5,505,046 | A * | 4/1996 | Nelson | F25B 21/02 165/236 |
| 5,851,458 | A * | 12/1998 | De Vos | B29C 44/5609 264/46.5 |
| 6,260,360 | B1 | 7/2001 | Wheeler | |
| 6,334,311 | B1 * | 1/2002 | Kim | F25B 21/02 62/3.2 |
| 2006/0000221 | A1 * | 1/2006 | Culp | F25B 21/02 62/3.6 |
| 2007/0068173 | A1 | 3/2007 | Sauciuc et al. | |
| 2007/0093102 | A1 | 4/2007 | Park et al. | |
| 2007/0283709 | A1 * | 12/2007 | Luse | H01L 21/67248 62/259.2 |
| 2008/0006436 | A1 * | 1/2008 | Sun | H01B 7/40 174/117 F |
| 2014/0318591 | A1 * | 10/2014 | Shelby | H01L 35/32 136/225 |
| 2015/0107269 | A1 * | 4/2015 | Oh | B60N 3/101 62/3.3 |
| 2015/0183377 | A1 * | 7/2015 | Ruffner | B60N 3/101 296/37.8 |
| 2016/0243000 | A1 * | 8/2016 | Gray | F25D 11/006 |
| 2017/0056289 | A1 * | 3/2017 | Tsuno | F25D 11/003 |
| 2017/0108269 | A1 * | 4/2017 | Shin | F25B 21/04 |
| 2018/0224198 | A1 * | 8/2018 | Jung | B29C 66/00145 |
| 2018/0231298 | A1 * | 8/2018 | Jung | F25D 19/006 |
| 2018/0231300 | A1 * | 8/2018 | Jung | F25D 19/006 |
| 2018/0238486 | A1 * | 8/2018 | Jung | F16L 59/065 |
| 2018/0356147 | A1 * | 12/2018 | Jung | F25D 23/064 |
| 2019/0255980 | A1 * | 8/2019 | Jung | B60N 3/104 |
| 2019/0381856 | A1 * | 12/2019 | Bae | F25D 29/003 |
| 2019/0381923 | A1 * | 12/2019 | Kim | B60N 3/104 |
| 2020/0013011 | A1 * | 1/2020 | Kashi | G07F 9/006 |
| 2020/0023763 | A1 * | 1/2020 | Lee | F25D 11/00 |
| 2020/0031265 | A1 * | 1/2020 | Jung | F25D 23/10 |
| 2020/0075830 | A1 * | 3/2020 | Spillner | H01L 35/30 |
| 2020/0080752 | A1 * | 3/2020 | Cho | F25D 29/005 |
| 2020/0187437 | A1 * | 6/2020 | Zhou | A01G 27/008 |
| 2020/0191451 | A1 * | 6/2020 | Hiemeyer | F25B 21/02 |

FOREIGN PATENT DOCUMENTS

| | | |
|---|---|---|
| DE | 3619176 | 12/1987 |
| EP | 0 860 669 | 8/1998 |
| JP | H 08-121929 | 5/1996 |
| JP | 09243244 | 9/1997 |
| JP | 2002-031456 | 1/2002 |
| JP | 2003-202183 | 7/2003 |
| JP | 2004-224236 | 8/2004 |
| KR | 10-2007-0043446 | 4/2007 |
| KR | 10-1210148 | 12/2012 |
| RU | 2002119744 | 3/2004 |
| RU | 2535502 | 12/2014 |
| WO | WO 03/019093 | 3/2003 |

OTHER PUBLICATIONS

International Search Report dated Apr. 11, 2017 issued in Application No. PCT/KR2016/014306.
Russian Office Action dated Aug. 21, 2019 issued in Application No. 2018125452.
Australian Office Action dated Jun. 13, 2019 issued in Application No. 2016373207.
European Search Report dated Jul. 18, 2019 issued in Application No. 16875972.8.
Russian Notice of Allowance dated May 25, 2020 issued in Application No. 2020106717/12 (English translation attached).

* cited by examiner

FIG. 10

| Group | | General plastic | | | | Engineering plastic | | | |
|---|---|---|---|---|---|---|---|---|---|
| Meaterial | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa·m-k/W | 79 | 460 | 689 | 448 | 189 | 357 | 420 | 552 |
| Heat Deflection Temp at 264 psi | °C | 80 | 132 | 146 | 125 | 126 | 121 | 105 ~ 260 | 160 |
| Max Operating Temperature | °C | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

FIG. 14
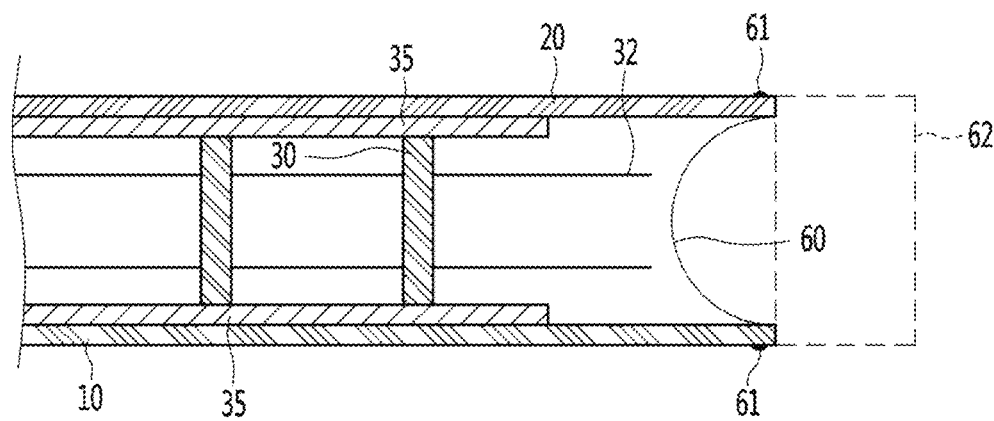
(a)
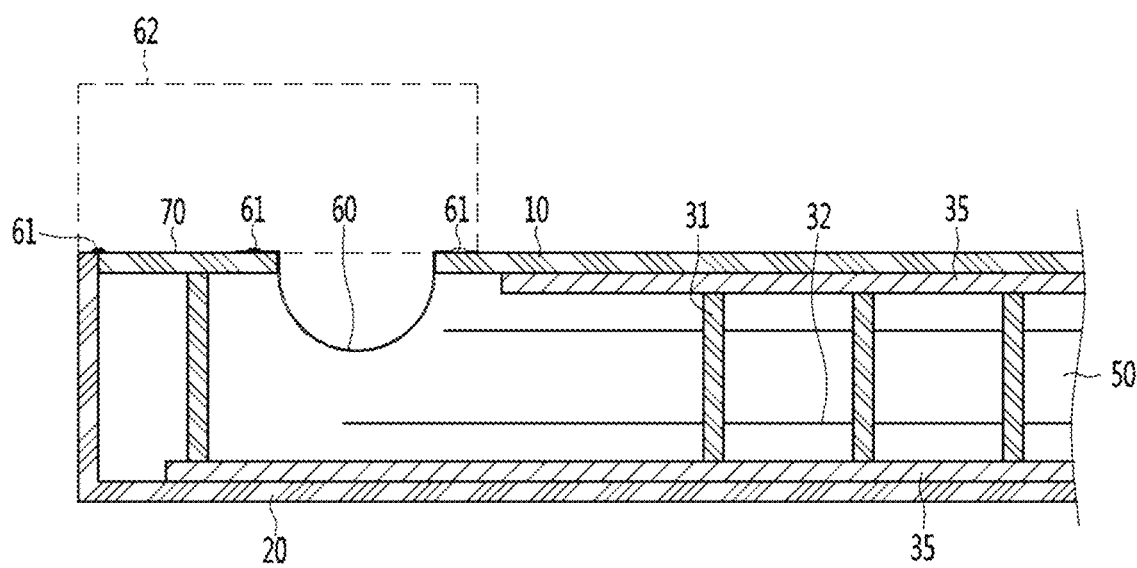
(b)

VACUUM INSULATOR IN A STOREHOUSE AND METHODS OF MAKING AND USING THE SAME

CROSS-REFERENCE TO RELATED PATENT APPLICATIONS

This application is a U.S. National Stage Application under 35 U.S.C. § 371 of PCT Application No. PCT/KR2016/014306, filed Dec. 7, 2016, which claims priority to Korean Patent Application No. 10-2015-0179480, filed Dec. 15, 2015, whose entire disclosures are hereby incorporated by reference.

TECHNICAL FIELD

Background Art

In some cases, a vehicle is equipped with a storehouse to store simple beverage cans or a small amount of food. The storehouse is mainly installed in an internal space such as an armrest so that a driver conveniently eats the beverage can or food. As the storehouse is installed in a luxury vehicle, an image of the vehicle is enhanced, and user's convenience is more improved.

When the storehouse installed in the vehicle uses an existing air conditioning system installed in the vehicle, it is difficult to allow the storehouse to reach a desired temperature, or a time taken to reach a target temperature is excessively long. In consideration of this limitation, a device using a thermoelectric module (TEM) is being introduced in recent years.

The thermoelectric module refers to a semiconductor mechanism that performs cooling or heating by using a thermoelectric effect. The thermoelectric effect means reversible and direct energy conversion between heat and electricity. The thermoelectric effect is an effect that generated by movement of charge carriers within a material, i.e., electrons and holes.

The thermoelectric effect may be divided into a Seebeck effect and a Peltier effect.

The Seebeck effect is an effect in which a temperature difference is directly converted to electricity. Thus, it may be applied to power generation field by using electromotive force generated due to a difference in temperature between both ends of the thermoelectric material. The Peltier effect is a phenomenon in which heat is generated at an upper junction and is absorbed at a lower junction when current flows to a circuit. Thus, it may be applied to cooling fields by using a difference in temperature both ends formed by the current applied from the outside. The Seebeck effect and the Peltier effect are different from joule heating in that the Seebeck effect and the Peltier effect are thermodynamically reversible.

There has been introduced a device that is fixedly mounted in a vehicle by using the above-described thermoelectric effect or stores food by using current of a vehicle cigar jack. However, these articles use a heat insulating material, which is exemplified by foaming urethane, for heat insulation. Thus, there is a limitation that a thick heat insulating wall is used, and sufficient heat insulating performance is not obtained even if the thick heat insulating wall is used.

To solve the above-described problem, a structure for allowing the heat insulating wall to be in a vacuum state. For example, a technique having a feature in which a surface area of an enclosure is five times an area of a heat transfer surface provided on a thermoelectric module in 'a heat insulating box body provided with the thermoelectric module' is disclosed in Japanese Patent Publication No. JP2003202183. Also, a structure in which a vacuum heat insulating material is provided between an outer case and an inner case is disclosed. Polystyrene is exemplified as a material having low thermal conductivity in paragraphs 39-45 of the cited document.

However, according to the above-described related art, sufficient vacuum may not be obtained. Thus, there is a problem that the sufficient heat insulating effect is not obtained. Also, since it is difficult to improve the performance of the thermoelectric module, a large cooling effect may not be obtained when compared to the consumed electric energy.

DISCLOSURE OF THE INVENTION

Technical Problem

An object of the present invention is to provide a vacuum insulator that improves thermal transfer performance of a thermoelectric module, a storehouse, a vehicle storehouse, and a vehicle.

An object of the present invention is to provide a vacuum insulator that is capable of obtaining sufficient heat insulating performance, a storehouse, a vehicle storehouse, and a vehicle.

An object of the present invention is to provide a vacuum insulator that is capable of stably maintaining high heat insulating performance for a long time, a storehouse, a vehicle storehouse, and a vehicle.

An object of the present invention is to provide a vacuum insulator that is capable of stably performing a function of a storehouse by using vacuum even though vibration occurs, a storehouse, a vehicle storehouse, and a vehicle.

Technical Solution

According to the present invention, in order to obtain high heat transfer performance between the inside and the outside of a space, a heat transfer block and a thermoelectric module come into surface contact with each other. The heat transfer block and the thermoelectric module may come into surface contact with each other in a vacuum space. In order to improve heat transfer performance, a heatsink may be provided outside the heat insulating space.

In order to obtain high heat insulating performance, the heat insulating space may be formed into high vacuum space, and a supporting unit for preventing a heat insulating wall from being contracted may be inserted into the heat insulating space.

In order to stably maintain the heat insulating performance for a long time, a nut may be coupled to one surface of a plate member, and a component such as a heat diffusion block may be fixed by a bolt coupled to the nut.

In order to improve the heat transfer performance within the high vacuum space, a thermal interface module may be intervened into a contact surface between the thermoelectric module and the heat diffusion block. In order to more improve the heat transfer performance, the thermal interface module may be made of a metal material, and the metal may include indium or lead.

In order to prevent a problem such as short circuit when power is introduced into the heat insulating space from occurring even though an impact is applied from the outside, a wire guide part that is provided by cutting a component so that a component disposed in the heat insulating space does not come into contact with an electric wire.

In order to prevent a problem such as short circuit from occurring by an air flow while a product is produced, a portion on which the thermoelectric module is placed and a portion on which an exhaust port is placed may be integrally provided to prevent power from leaking and to allow a storehouse to stably operate.

In order to prevent vacuum damage from occurring due to outgassing of a conducting wire introduced into the high vacuum space and to enable the conducting wire to be bent, only at least a portion of the conducting wire may be covered.

Advantageous Effects

According to the present invention, the improvement of the heat insulating effect due to the high degree of vacuum may be obtained, and also, the surface contact between the components placed in the vacuum space part may be improved. Thus, the thermal conductivity may be improved to improve the heat transfer performance of the thermoelectric module.

According to the present invention, the thermoelectric module may be disposed in the vacuum space part without performing a separate coupling operation such as the bolt coupling by the vacuum pressure of the vacuum space part.

According to the present invention, the heat diffusion module and the heatsink may be respectively coupled to only the plates but be coupled to the single body passing through the vacuum space part to secure the reliable coupling without deteriorating the thermal conductivity.

According to the present invention, the thermal interface module having the metal material having the low outgassing property may be intervened into the contact surface between the components placed in the vacuum space part, and the thermal interface module may be intervened into the contact surface between the components placed outside the vacuum space part to more improve the heat conduction performance.

According to the present invention, in order to supply the power to the thermoelectric module placed in the vacuum space part, the electric wire disposed in the vacuum space part may be provided to be peeled off to more reduce the outgassing. Here, in order to prevent the electric wires from being short-circuited with each other, the sheath of the electric wire may be disposed so that the protrusion sheaths are spaced apart from each other to prevent the electric wires from being short-circuited with each other or to prevent the electric wire from being short-circuited with the external component.

According to the present invention, the thermal interface module made of the metal material may be inserted between the thermoelectric module and the plate to prevent the heat conduction performance from being deteriorated even though the plate member is deformed by the high vacuum pressure.

BRIEF DESCRIPTION OF THE DRAWINGS

FIG. 10 is a diagram for explaining results obtained by examining resins used for manufacturing a supporting unit.

FIG. 14 is a view illustrating various embodiments of conductive resistance sheets and peripheral portions thereof.

MODE FOR CARRYING OUT THE INVENTION

Figure 1:
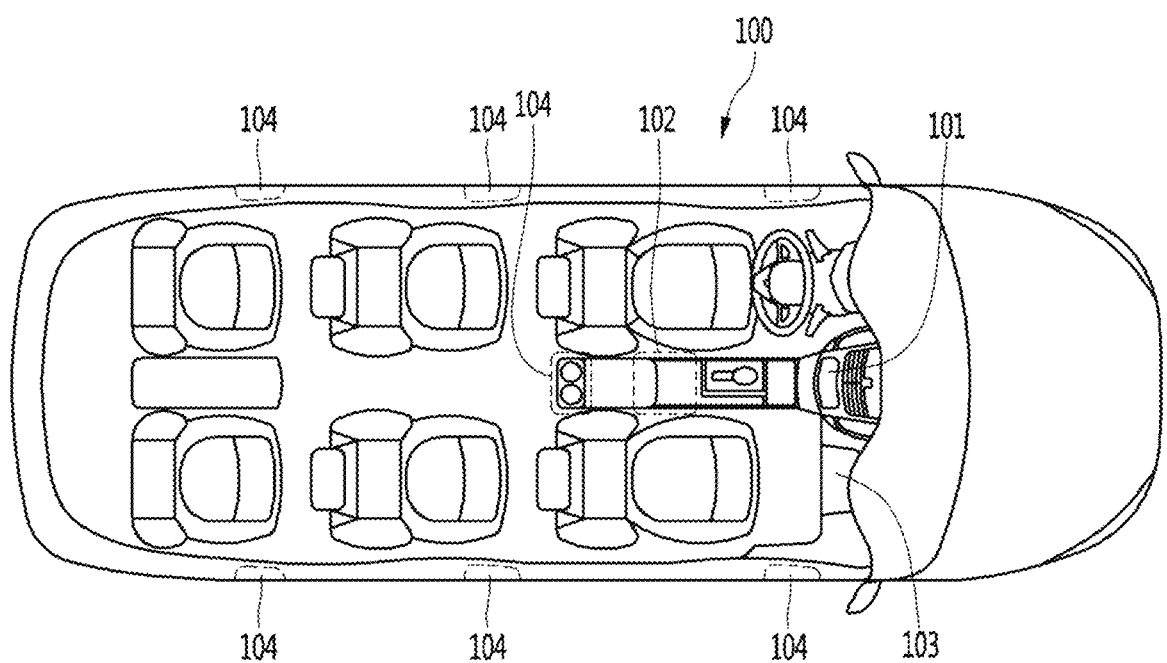
FIG. 1 is a plan view of a vehicle according to an embodiment.

FIG. 1 is a plan view of a vehicle according to an embodiment.

At least one or more storehouses may be provided in a vehicle 100 according to an embodiment. For example, the storehouse may be at least one of a console box storehouse 101 mainly used by a driver, an armrest storehouse 102 disposed in an armrest mainly used by the driver or an assistant driver, a globe box storehouse 103 disposed in a globe box mainly used by the assistant driver, a passenger side storehouse 104 mainly used by a passenger in the rear seat, and a door side storehouse 104 provided in a door of the vehicle. The storehouses 101, 102, 103, and 104 may perform a function of at least one of cold storage and warm storage or a function of a cooling and heating cabinet.

Hereinafter, in description according to embodiments, the cold stage will be mainly described. However, it may be understood that a case in which it is written as the cold storage/warm storage refers to all of the cold storage, the warm storage, and cold and warm storage.

The storehouse may perform the function of the cold storage/warm storage by using a thermoelectric module.

Figure 2:
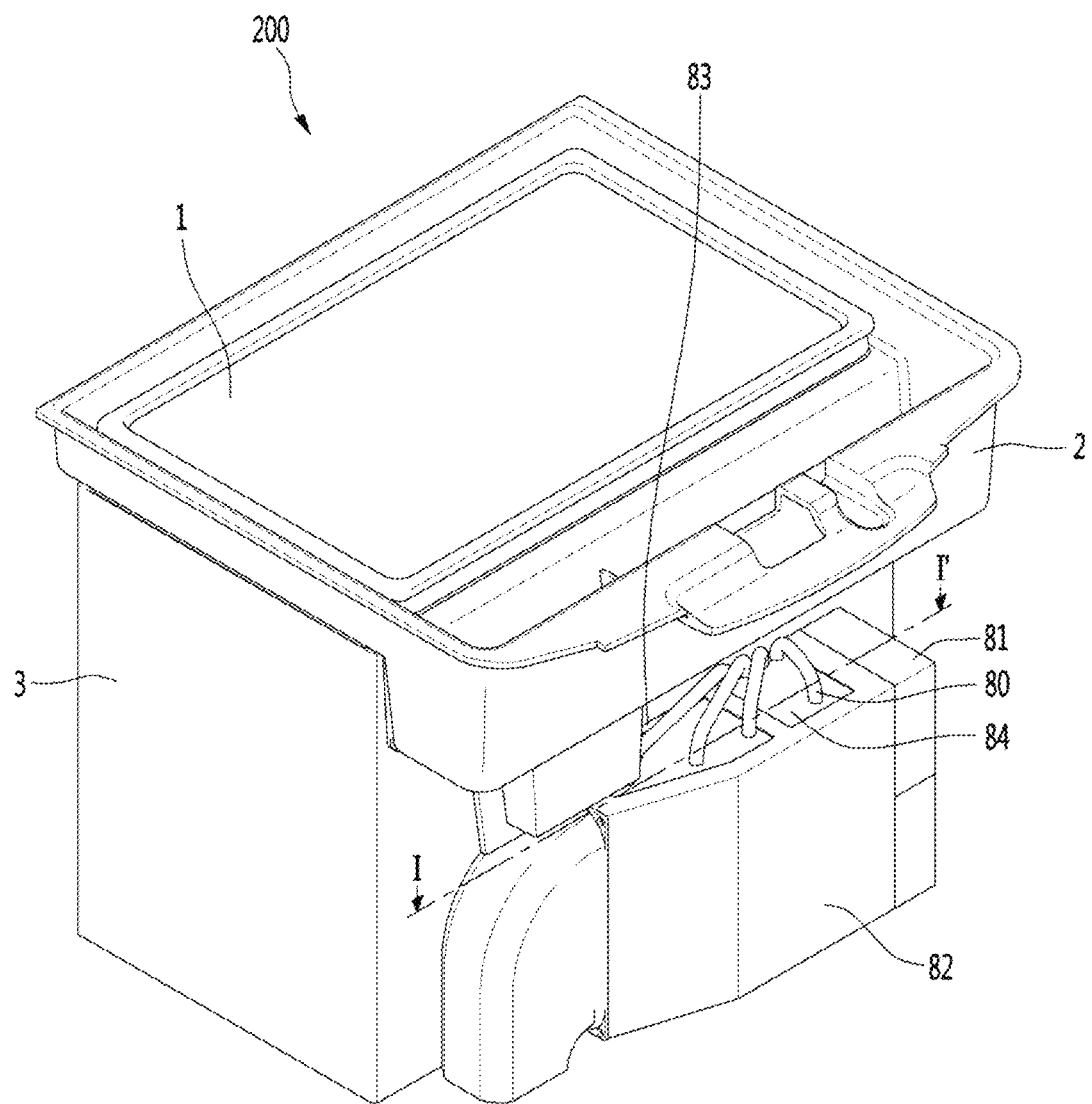
FIG. 2 is a view of a storehouse for a vehicle according to an embodiment.

FIG. 2 is a view of the storehouse for the vehicle according to an embodiment.

Referring to FIG. 2, the storehouse 200 for the vehicle includes a main body 3 having a space in which articles are stored therein and of which at least an external portion is opened, a door 1 provided to open and close an opened portion of the main body 3 by a user, and a fitting part 2 for accurately positioning the main body when the main body is mounted in the vehicle.

The fitting part 2 assembles at least one of the main body 3 and the door 1 to match the vehicle. Thus, corresponding portions when the storehouse 200 for the vehicle and the vehicle 100 are assembled may be stably maintained in performance without being separated from each other even though an impact and vibration are applied during the operation of the vehicle. The fitting part 2 may buffer the vibration and impact to reduce an adverse influence affected to the storehouse 200 for the vehicle.

When the storehouse 200 for the vehicle is not mounted in the vehicle and thus used to be separated from the vehicle, the fitting part 2 may not be provided. In this case, the storehouse 200 for the vehicle may be called a storehouse. Hereinafter, if called the storehouse without a specific designation, it should be understood as a concept including the storehouse for the vehicle.

A heatsink 83 for absorbing heat from an outer surface of the second plate member 20 providing an outer surface of the storehouse is disposed on any one surface of the main body 3. The heatsink 83 may promote heat exchange. The heat absorbed by the heatsink 83 may be discharged to the outside by a heat pipe that quickly transfers the heat of the heatsink 83 to the outside, a fin 84 that convectively cools the heat rapidly, a duct 82 that separates a space, in which the fin 84 is disposed, from the outside, and a fan 81 that allows air to flow to the duct 82.

The heatsink 83, the heat pipe 80, the fin 84, the duct 82, and the fan 81 are disposed in an external environment different from an internal environment of the storehouse. Thus, the heat or cold air may be quickly released from the internal environment to the external environment.

Figure 3:
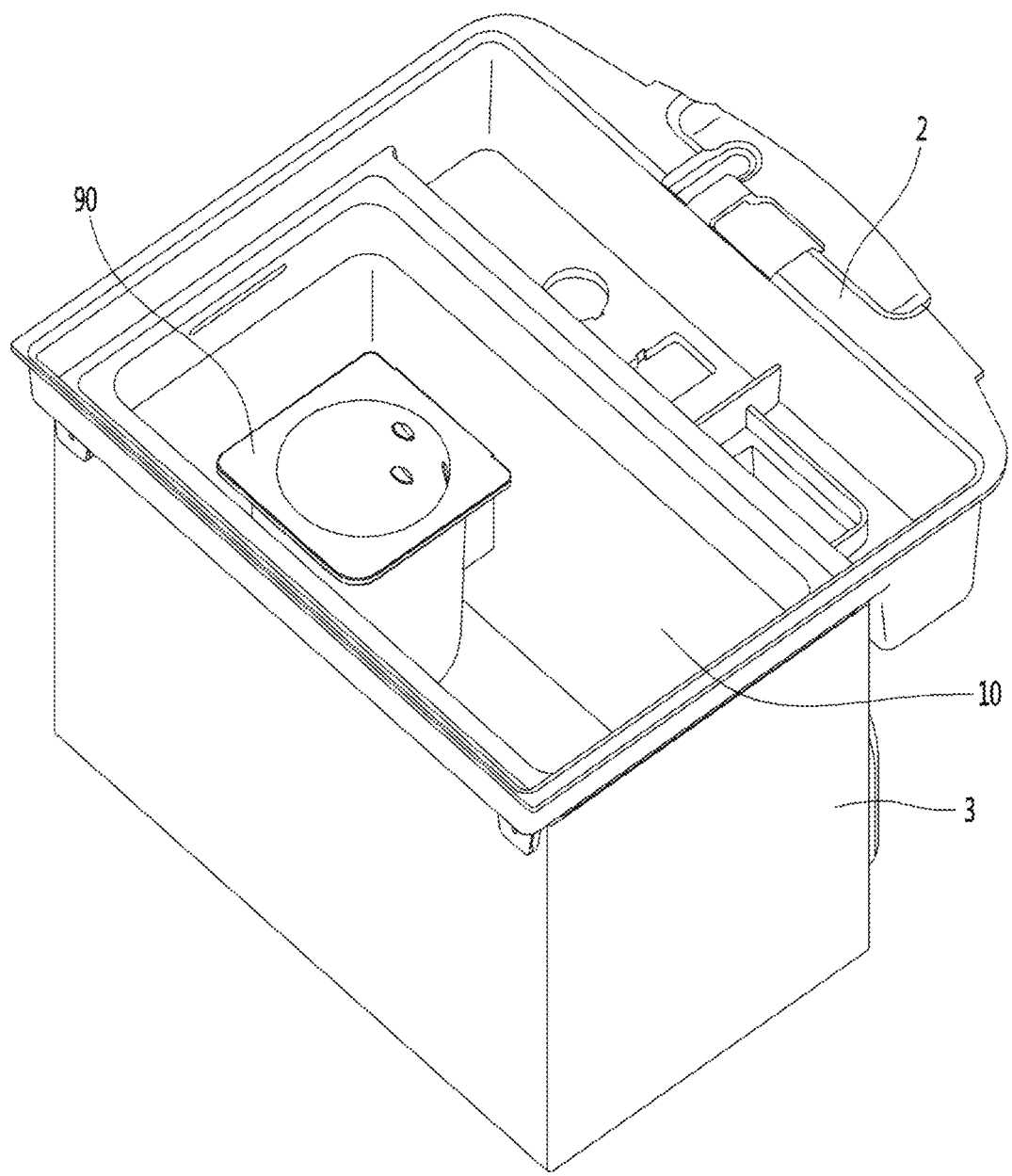
FIG. 3 is a top perspective view of the storehouse in a state in which a door is removed.

FIG. 3 is a top perspective view of the storehouse in a state in which the door is removed.

Referring to FIG. 3, a holder 90 may be provided in an internal space of the storehouse 200. An appliance for taking water or beverage such as a water bottle or a beverage can may be disposed on the holder 90. The holder may come into contact with the first plate member 10 of the storehouse to allow the cold air to be quickly transferred from the first plate member 10. Here, since the holder 90 is made of a material having high thermal conductivity such as aluminum, the transfer of the cold air to the appliance for taking water or beverage may be more quickly performed.

Figure 4:
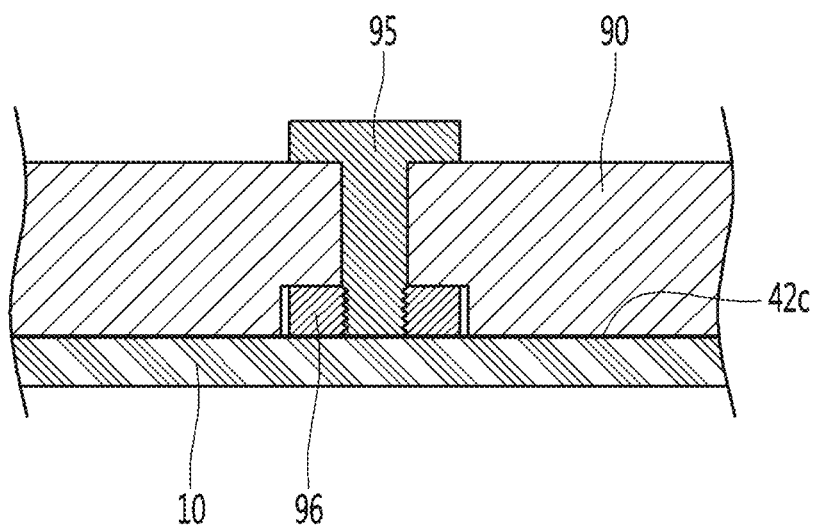
FIG. 4 is a cross-sectional view of a portion at which a holder and the storehouse come into contact with each other.

FIG. 4 is a cross-sectional view of a portion at which a holder and the storehouse come into contact with each other.

Referring to FIG. 4, the first plate member 10 and the holder 90 may come into contact with each other. In order to improve the thermal conductivity of the heat passing through the contact surface between the first plate member 10 and the holder 90, the first plate member 10 and the holder 90 may be pressed to be coupled to each other. A thermal interface module (TIM) may be inserted into the contact surface between the first plate member 10 and the holder 90 to more promote the heat conduction.

In order to provide the press coupling, a nut 96 is coupled to an inner surface of the first plate member 10. The nut 96 may be coupled to the first plate member 10 through welding. In an installation position of the holder 90, a hole having an expanded head part may be provided at a position corresponding to the nut 96, and a bolt 95 is inserted into the hole. The bolt 95 may be coupled to the nut 96 to maintain the press coupling between the first plate member 10 and the holder 90.

Figure 5:
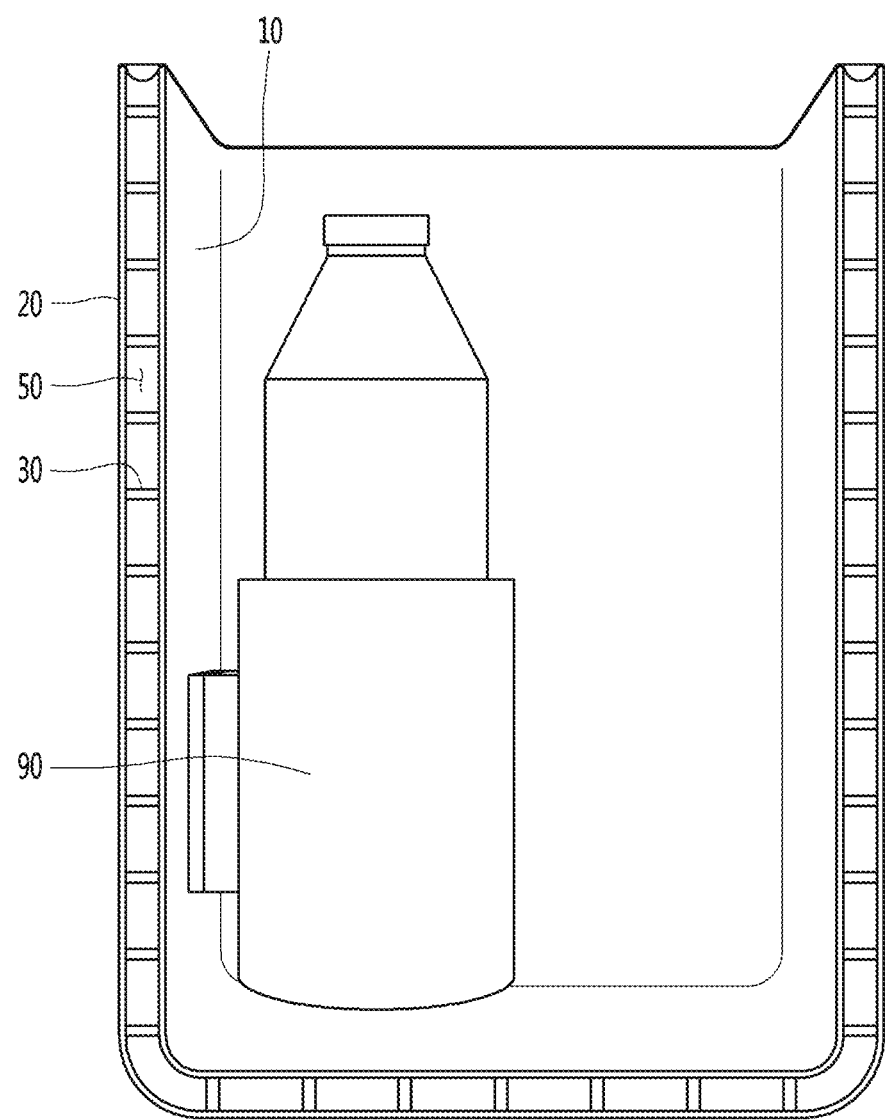
FIG. 5 is a cross-sectional view of the storehouse.

FIG. 5 is a cross-sectional view of the storehouse.

Referring to FIG. 5, in the storehouse according to an embodiment, the cold air may be quickly transferred from the first plate member 10 through the holder 90 in the conduction process. Thus, the user may quickly take cold food. Since a thermoelectric module 40 is coupled together to a side surface of the first plate member 10 to which the holder 90 is coupled, the appliance for taking water or beverage may be more quickly cooled.

Reference numeral 20 represents the second plate member 20 providing an outer surface of the storehouse 20, and reference numeral 30 represents a supporting unit 30 that maintains a vacuum pressure of a spacing part between the first plate member 10 and the second plate member 10. This will be described later in more detail.

Figure 6:
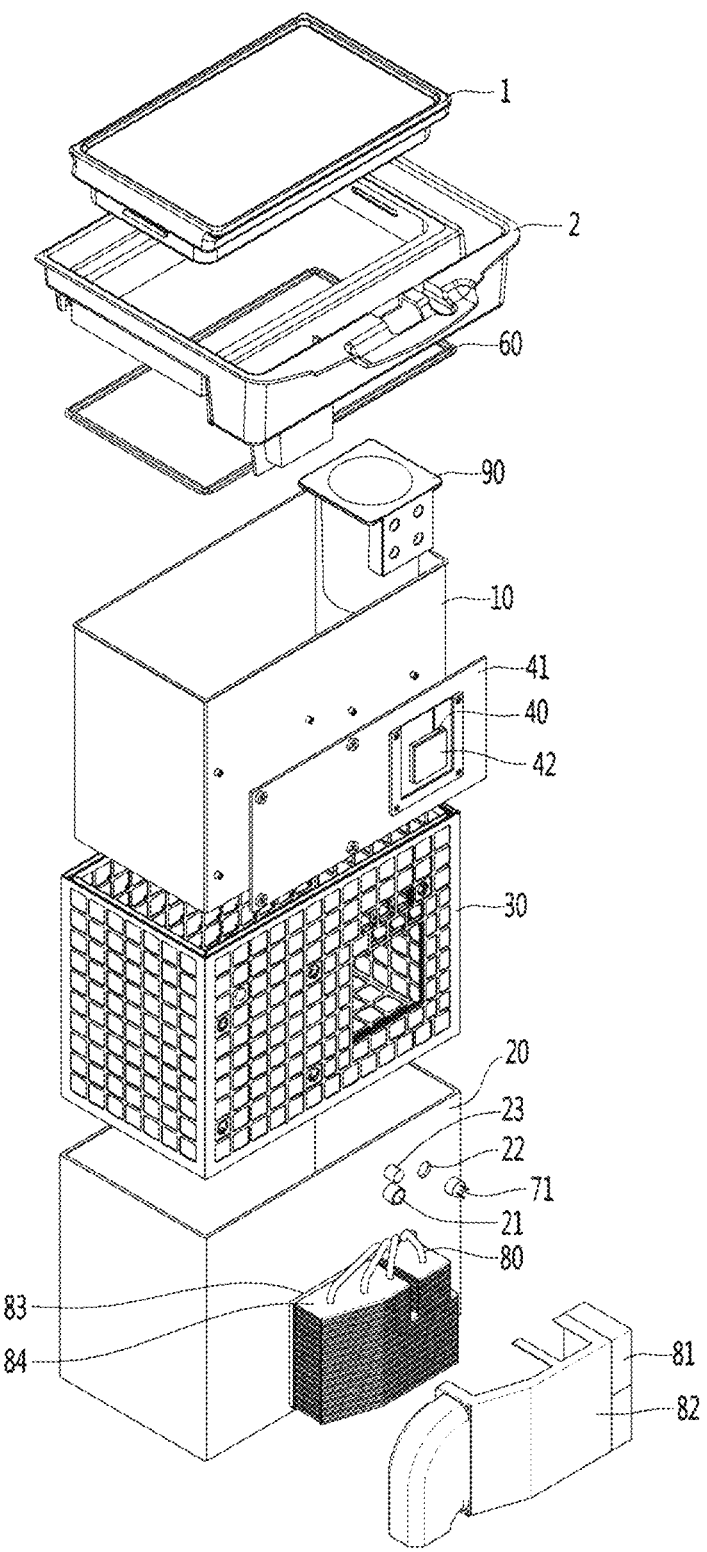
FIG. 6 is an exploded perspective view of the storehouse for the vehicle.

FIG. 6 is an exploded perspective view of the storehouse for the vehicle.

Referring to FIG. 6, each of the main body 3 and the door 1 may be provided as a vacuum insulator. For this, the vacuum insulator includes the first plate member 10 for providing the wall of a low-temperature space, the second plate member 20 for providing the wall of a high-temperature space, a vacuum space part 50 defined as a spacing part between the first and second plate members 10 and 20. The vacuum insulator includes a conductive resistance sheet 60 for preventing heat conduction between the first and second plate members 10 and 20.

The conductive resistance sheet 60 serves as a heat resistance unit that resists the heat transfer between the plate members. The heat resistance unit may include the conductive resistance sheet and refer to a unit that is capable of resisting the heat transfer (where the heat transfer may include the form of conduction, convection, and radiation) between the plate members.

In the storehouse, the first plate member 10 may be called an inner case, and the second plate member 20 may be called an outer case. An exhaust port 21 for exhausting air of the vacuum space part 50 to create a vacuum state may be provided on the second plate member 20. A getter port 23 in which a getter is disposed to maintain the vacuum state may be provided on the second plate member 20. The getter may be disposed in the getter port 23 to more improve a degree of vacuum after the exhaust is completed and also maintain the high degree of vacuum for a long time. A power source hole 22 through which power is supplied to the thermoelectric module 40 disposed in the vacuum space part 50 may be provided in the second plate member 20.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum insulator of the embodiment may also be applied to a product further having a separate wall contacting each space.

Due to characteristics of the storehouse for the vehicle, which is often opened and closed and has many impacts, the door 1 may have a heat insulating structure made of a foaming resin, but a vacuum insulator, to prevent malfunction. However, in order to maximize the cooling effect using the high heat insulating performance, the vacuum insulator may be applied to the door.

The sealing terminal 71 may be weld to the power source hole 22 to maintain sealing of the vacuum space part 50. A wire within the vacuum space part 50 may be connected to an inner portion of a terminal provided on the sealing terminal, and a wire from the outside may be connected to an outer portion of the terminal provided on the sealing terminal to maintain power supply.

The supporting unit 30 may be provided to reduce deformation of the vacuum space part 50. The supporting unit 30 includes a bar 31. The bar 31 may extend in a substantially vertical direction with respect to the plate members between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20.

The heat diffusion block 41 may come into contact with an outer surface of the first plate member 10. The inner surface of the thermoelectric module 40 comes into contact with an outer surface of the heat diffusion block 41. An inner surface of the second plate member 20 may come into contact with the outer surface of the thermoelectric module.

The thermal interface module may be intervened into the contact surfaces of the components to quickly perform the heat conduction. When the storehouse is used as a refrigerator, the thermoelectric module 40 may absorb heat from the heat diffusion block 41 and release heat to the second plate member 20. Here, in order to quickly transfer the heat in the heat conduction manner, the thermal interface module may be intervened into each of the contact surfaces.

Figure 7:
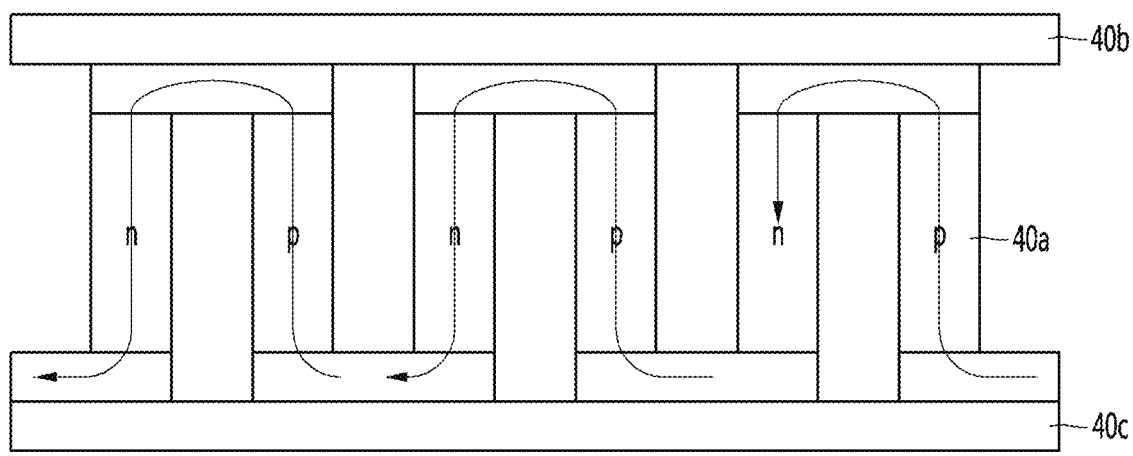
FIG. 7 is a view for explaining a function of a thermoelectric module.

FIG. 7 is a view for explaining a function of the thermoelectric module. Referring to FIG. 7, the thermoelectric module has a structure in which semiconductors 40a having different polarities are connected in series to each other. A first temperature part 40c may be generated on any one surface of the thermoelectric module 40, and a second temperature part 40b may be generated on another surface of the thermoelectric module 40 according to a flow direction of current.

The first temperature part 40c and the second temperature part 40b may come into contact with the outer surface of the heat diffusion block 41 and the inner surface of the first plate member 20, respectively.

Figure 8:
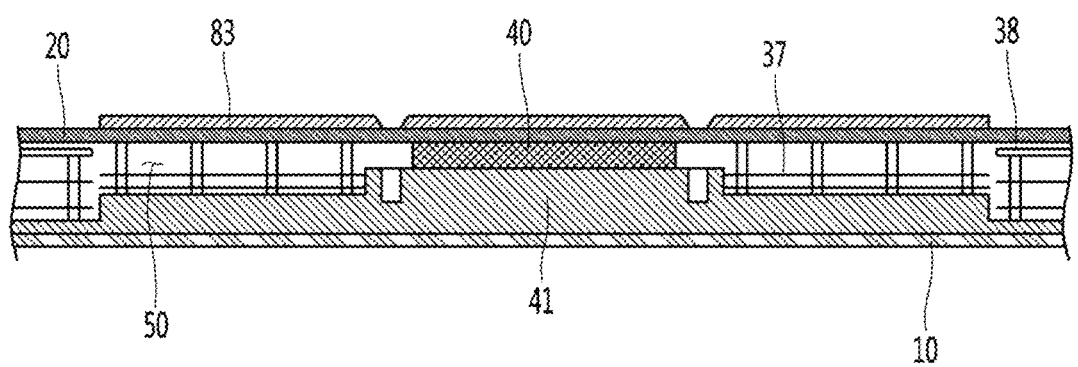
FIG. 8 is a schematic cross-sectional view of any one surface of the storehouse on which the thermoelectric module is disposed.

FIG. 8 is a schematic cross-sectional view of any one surface of the storehouse on which the thermoelectric module is disposed.

Referring to FIG. 8, the supporting unit 30, the heat diffusion block, and the thermoelectric module 40 are disposed in an internal space of the vacuum space part 50. The heat diffusion block 41 may come into contact with the outer surface of the first plate member 10. The inner surface of the thermoelectric module 40 comes into contact with the outside of the heat diffusion block 41. The outer surface of the thermoelectric module 40 comes into contact with the inner surface of the second plate member 20. The heat diffusion block 41 performs heat conduction to a wide area of the first plate member 10. On the other hand, the heat diffusion block 41 performs heat conduction to a narrow area together with the thermoelectric module 40. Thus, with respect to an action of the thermoelectric module 40 as a portion causing the action, the heat diffusion block 41 may be a passive heat transfer member and thus do not act as a resistor to the heat conduction.

According to the above-described structure, the heat diffusion block 41 may absorb heat to the wide area of the first plate member 10, and the absorbed heat may be transferred to the second plate member 20 by passing through the thermoelectric member 40. The heatsink 83 may come into contact with the outer surface of the second plate member 20 to absorb heat from the second plate member 20. The heatsink 83 may have an area greater than that in a direction corresponding to the thermoelectric module 40. Thus, the second plate member 20 may be quickly cooled.

The supporting unit 30 may include a first supporting unit 37 disposed on a portion on which the thermoelectric module and the heat diffusion block 41 are disposed and a second supporting unit 38 disposed on a portion facing the plate members 10 and 20.

The first supporting unit 37 may have a height less than that of the second supporting unit 38. This is done for providing sufficient strength with respect to the portion on which the thermoelectric module 41 and the heat diffusion block are disposed to prevent the plate members 10 and 20 from being deformed by the vacuum pressure.

The support unit may not be provided, but the thermoelectric module 40 may come into direct surface contact with the second plate member 20. The contact area may serve as a portion for improving contact reliability between the thermoelectric module 40 and the second plate member 20. That is to say, in order to improve the thermal conductivity on both surfaces of the thermoelectric module 40, the contact surface between the thermoelectric module 40 and the second plate member 20 and the contact surface between the thermoelectric module 40 and the heat diffusion block 41 may be pressed by using the vacuum pressure of the vacuum space part 50 without a separate pressing structure. For this, the degree of vacuum of the vacuum space part 50 may be maintained to a considerable high level.

In the first supporting unit 37, a distance between the bars 31 may be adjusted in consideration of the support operation of the second plate member 2 and the pressing operation both the surfaces of the thermoelectric module 40. For example, a distance between an edge of the thermoelectric module 40 and the bar 31 that is the closest to the edge may be greater 1.1 times to 3 times than that between the bars. Thus, high reliability with respect to the pressing operation on both the surfaces of the thermoelectric module 40 may be secured.

The supporting unit will be described in more detail.

Figure 9:
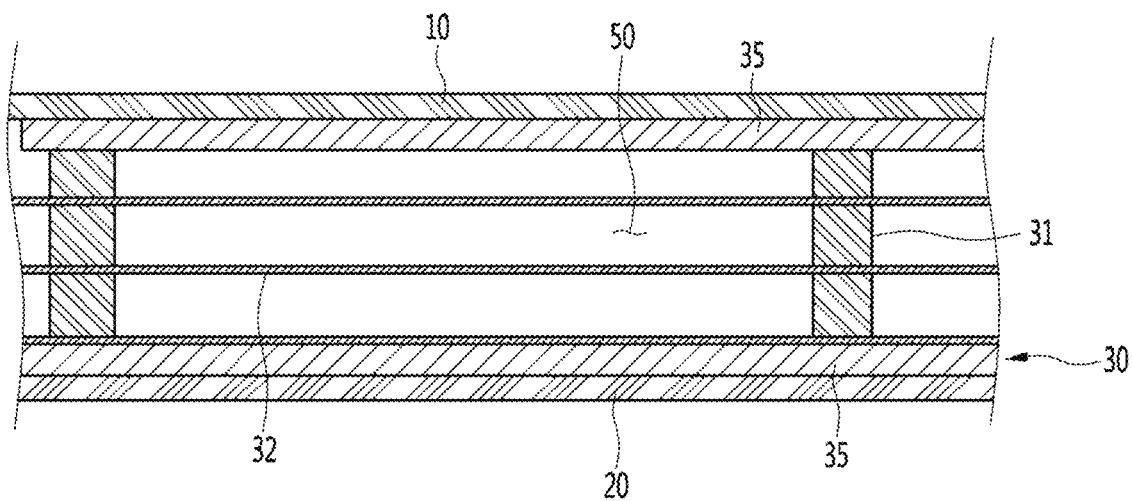
FIG. 9 is a view illustrating the inside of a vacuum space part.

FIG. 9 is a view illustrating the inside of a vacuum space part.

Referring to FIG. 9, the vacuum space part 50 may be provided in a third space having a pressure different from that of each of the first and second spaces, preferably, a vacuum state, thereby reducing an adiabatic loss. The third space may be provided at a temperature between the temperature of the first space and the temperature of the second space. The third space is provided as a space in the vacuum state. Thus, the first plate member 10 and the second plate member 20 may subjected to force through which the first plate member 10 and the second plate member 20 are contracted in a direction in which the first plate member 10 and the second plate member 20 approach each other by force equivalent to a pressure difference between the spaces. As a result, the vacuum space part 50 may be deformed in a direction in which the vacuum space part 50 decreases in volume. In this case, the adiabatic loss may be caused due to an increase in amount of heat radiation, caused by the contraction of the vacuum space part 50, and an increase in amount of heat conduction, caused by contact between the plate members 10 and 20.

The supporting unit 30 may be provided to reduce deformation of the vacuum space part 50. The supporting unit 30 includes a bar 31. The bar 31 may extend in a substantially vertical direction with respect to the plate members to support a distance between the first plate member and the second plate member.

A support plate 35 may be additionally provided on at least any one end of the bar 31. The support plate 35 may connect at least two or more bars 31 to each other to extend in a substantially horizontal direction with respect to the first and second plate members 10 and 20. The support plate 35 may be provided in a plate shape or may be provided in a lattice shape so that an area of the support plate contacting the first or second plate member 10 or 20 decreases to reduce heat transfer.

The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

The supporting unit 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 for reducing heat radiation between the first and second plate members 10 and 20 through the vacuum space part 50 will be described. The radiation resistance sheet 32 may be provided in the heat resistance unit. The heat resistance unit may be provided in a space that is in a vacuum state provided in the plate member. The heat resistance unit may refer to a constituent in which all or a portion of members that prevent heat transfer between the first space and the second space are provided.

The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, since the transfer of radiation heat cannot be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

FIG. 10 is a diagram for explaining results obtained by examining resins used for manufacturing a supporting unit.

Referring to FIG. 10, the present inventor has examined various resins, and most of the resins cannot be used because their outgassing rates and water absorption rates are remarkably high. Accordingly, the present inventor has examined resins that approximately satisfy conditions of the outgassing rate and the water absorption rate. As a result, PE is inappropriate to be used due to its high outgassing rate and its low compressive strength. PCTFE is not preferable to be used due to its remarkably high price. PEEK is inappropriate to be used due to its high outgassing rate.

Accordingly, it is seen that that a resin selected from the group consisting of polycarbonate (PC), glass fiber PC, low outgassing PC, polyphenylene sulfide (PPS), and liquid crystal polymer (LCP) may be used as the material of the supporting unit. However, an outgassing rate of the PC is 0.19, which is at a low level. Hence, as the time required to perform baking in which exhaustion is performed by applying heat is increased to a certain level, the PC may be used as the material of the supporting unit.

The present inventor has found an optimal material by performing various studies on resins expected to be used inside the vacuum space part. Hereinafter, results of the performed studies will be described with reference to the accompanying drawings.

Figure 11:
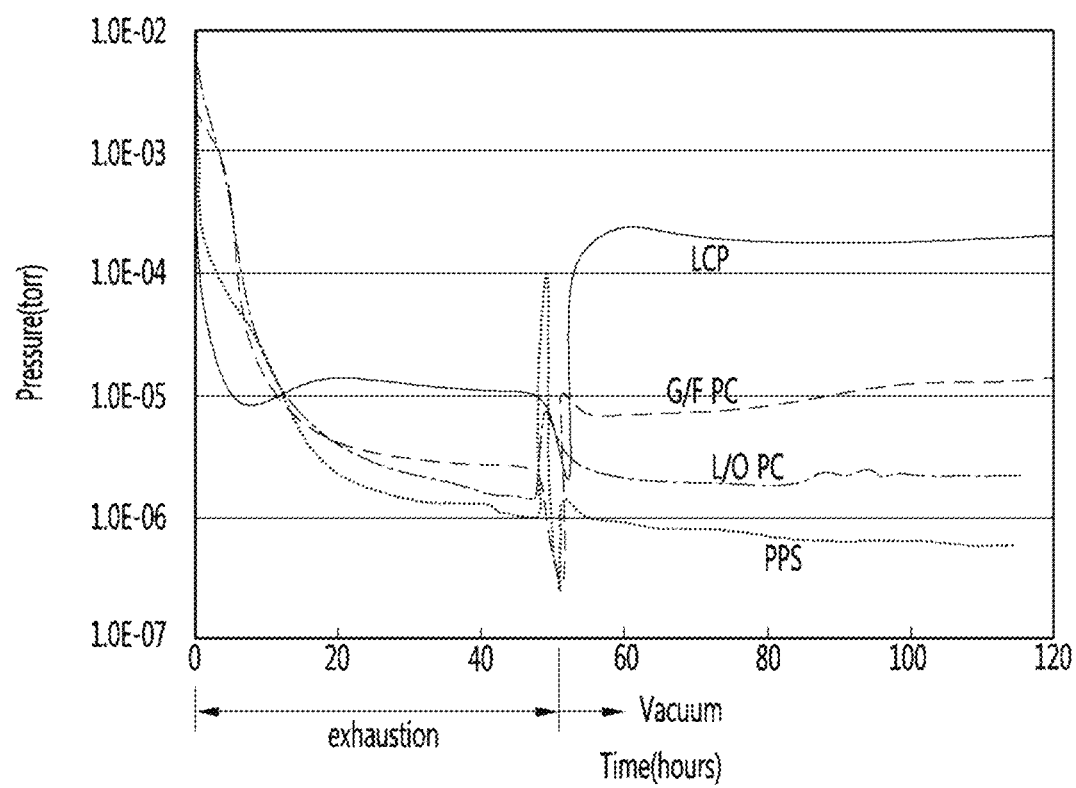
FIG. 11 is a view illustrating results obtained by performing an experiment on vacuum maintenance performances of the resins.

FIG. 11 is a view illustrating results obtained by performing an experiment on vacuum maintenance performances of the resins.

Referring to FIG. 1, there is illustrated a graph showing results obtained by fabricating the supporting unit using the respective resins and then testing vacuum maintenance performances of the resins. First, a supporting unit fabricated using a selected material was cleaned using ethanol, left at a low pressure for 48 hours, exposed to the air for 2.5 hours, and then subjected to an exhaust process at 90° C. for about 50 hours in a state that the supporting unit was put in the vacuum insulator, thereby measuring a vacuum maintenance performance of the supporting unit.

It may be seen that in the case of the LCP, its initial exhaust performance is best, but its vacuum maintenance performance is bad. It may be expected that this is caused by sensitivity of the LCP to temperature. Also, it is expected through characteristics of the graph that, when a final allowable pressure is $5 \times 10^{-3}$ Torr, its vacuum performance will be maintained for a time of about 0.5 year. Therefore, the LCP is inappropriate as the material of the supporting unit.

It may be seen that, in the case of the glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance will be maintained under the same condition for a time of about 8.2 years. Therefore, the LCP is inappropriate as the material of the supporting unit.

It is expected that, in the case of the low outgassing PC (O/G PC), its vacuum maintenance performance is excellent, and its vacuum performance will be maintained under the same condition for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is remarkably excellent, and its exhaust performance is also excellent. Therefore, it is most preferably considered that, based on the vacuum maintenance performance, the PPS is used as the material of the supporting unit.

Figure 12:
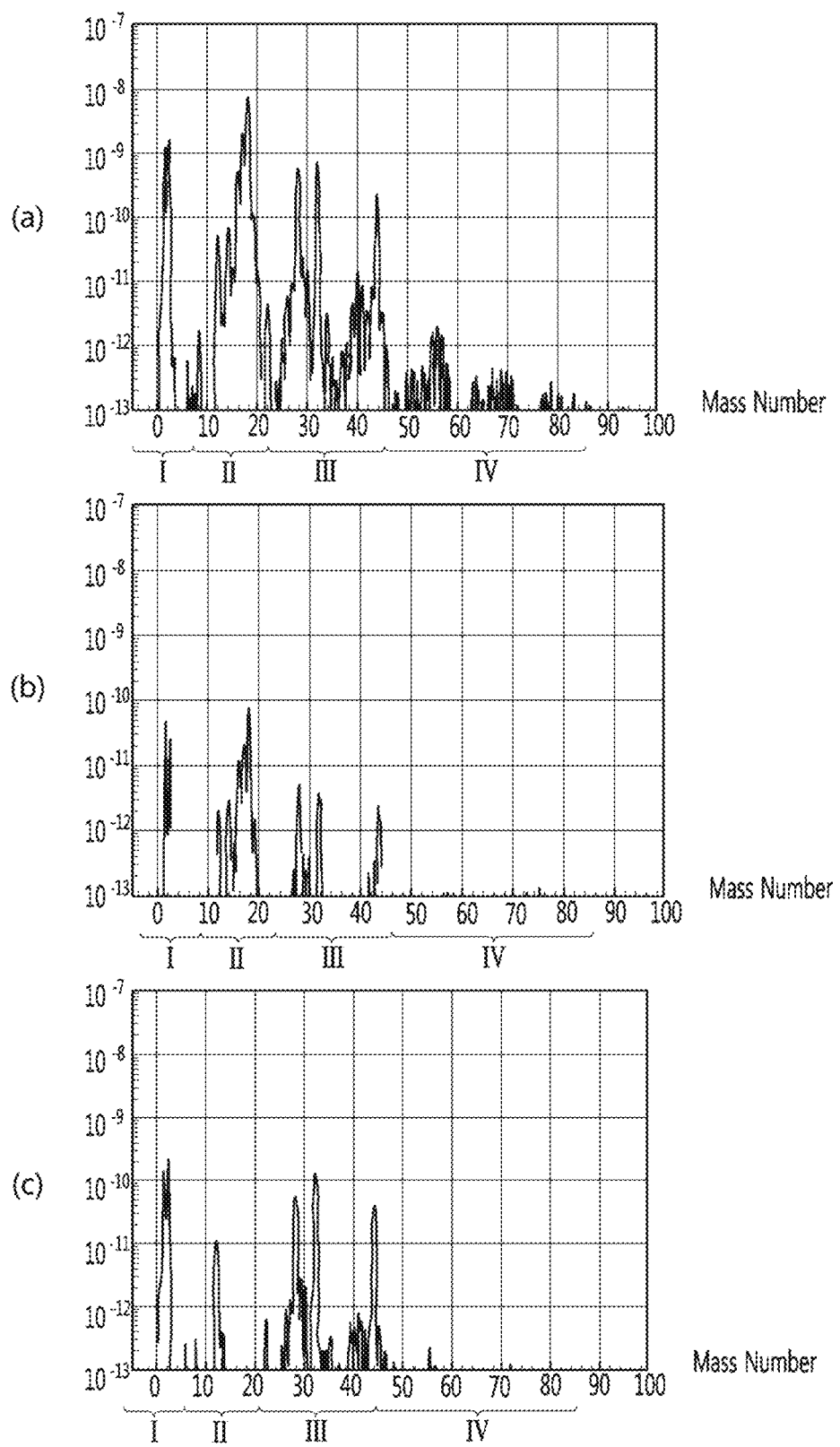
FIG. 12 is a graph illustrating results obtained by analyzing components of gases discharged from PPS and low outgassing PC.

FIG. 12 illustrates results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that $H_2$ series (I), $H_2O$ series (II), $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel.

As the analyzed result, it may be re-confirmed that the PPS is excellent as the material of the supporting unit.

Figure 13:
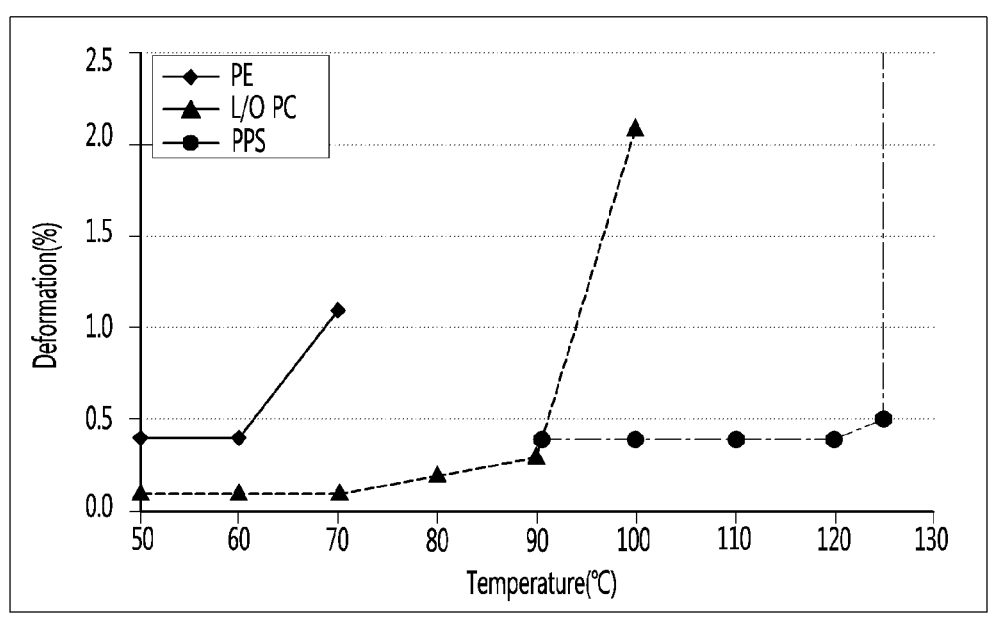
FIG. 13 is a graph illustrating results obtained by a maximum deformation temperature at which the resins are damaged by atmospheric pressure in high-temperature exhaustion.

FIG. 13 illustrates results obtained by measuring maximum deformation temperatures at which resins are damaged by atmospheric pressure in high-temperature exhaustion. At this time, the bars 31 were provided with a diameter of 2 mm at a distance less than 30 mm. Referring to FIG. 13, it may be seen that a rupture occurs at 60° C. in the case of the PE, a rupture occurs at 90° C. in the case of the low outgassing PC, and a rupture occurs at 125° C. in the case of the PPS.

As the analyzed result, it may be seen that the PPS is most preferably used as the resin used inside the vacuum space part. However, the low outgassing PC may be used in terms of fabrication cost.

FIG. 14 is a view illustrating various embodiments of conductive resistance sheets and peripheral parts thereof. Structures of the conductive resistance sheets are briefly illustrated in FIG. 6, but will be understood in detail with reference to FIG. 14.

First, a conductive resistance sheet proposed in FIG. 14A may be preferably applied to the vacuum insulation applied to the main body 3. Specifically, the first and second plate members 10 and 20 are to be sealed so as to vacuumize the interior of the vacuum insulator. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the storehouse, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion corresponding to the vacuum insulator used in the main body 3 when the door 1 is closed.

A conductive resistance sheet proposed in FIG. 14B may be preferably applied to the vacuum insulator provided in the door 1. In FIG. 14B, portions different from those of FIG. 14A are described in detail, and the same description is applied to portions identical to those of FIG. 14A. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the case of the main body, but the mounting positions of parts are limited in the case of the door.

In the vacuum insulator used in the door 1, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

Figure 15:
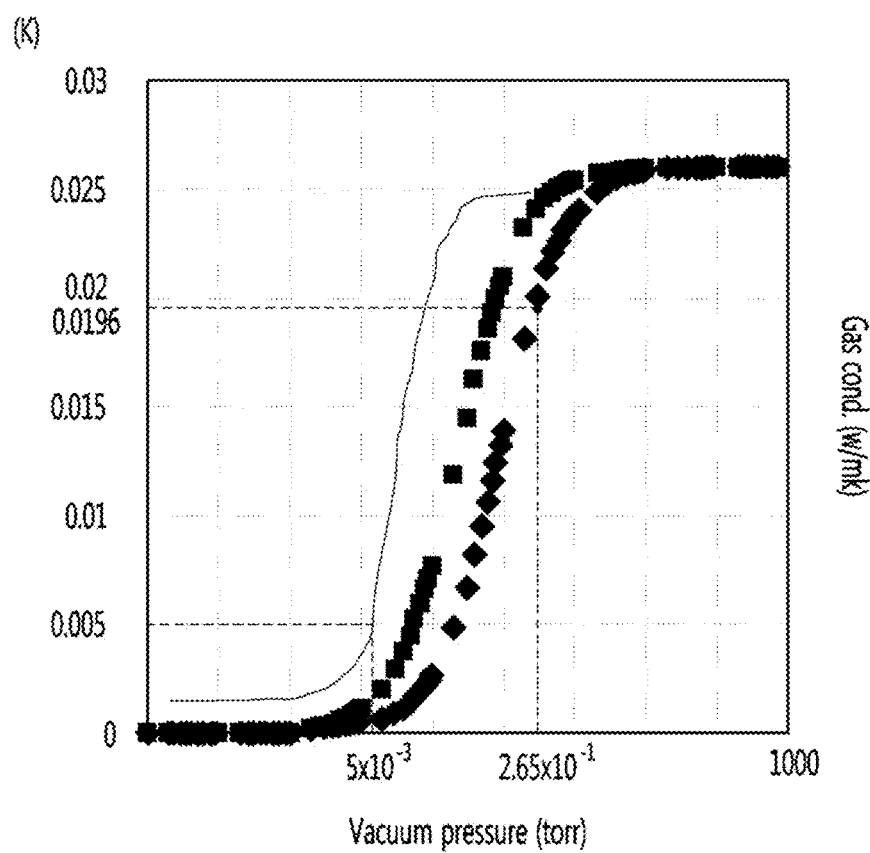
FIG. 15 is a graph illustrating results obtained by comparing a vacuum pressure with gas conductivity.

FIG. 15 is a graph obtained by comparing a vacuum pressure with gas conductivity.

Referring to FIG. 15, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part

50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It was seen that, since the size of the gap is small at a point corresponding to a substantial heat transfer coefficient of 0.0196 W/mK of the storehouse according to the related art, which is provided with a adiabatic material formed by foaming polyurethane, the vacuum pressure was $2.65 \times 10^{-1}$ Torr even when the size of the gap is 2.76 mm. Meanwhile, the point at which reduction in adiabatic effect caused by gas conduction heat is saturated even though the vacuum pressure is decreased is a point at which the vacuum pressure is approximately $5 \times 10^{-4}$ Torr. Also, when greater than $5 \times 10^{3}$ Torr, the heat insulating effect is sharply reduced. Under this conditions, the vacuum pressure of 5×10-3 Torr may be defined as the point at which the reduction in adiabatic effect caused by gas conduction heat is saturated. Thus, in order to the optimal heat insulating performance having no radiation heat transfer, the vacuum pressure of the vacuum space part may be maintained to $5 \times 10^{-3}$ Torr or less.

As described above, a pressure within the vacuum space part 50 may be maintained in the substantially vacuum state in which a gas is very lean to reduce the radiation heat transfer. Thus, a considerable amount of pressure is applied between the plate members 10 and 20, and contracting force is applied in a direction in which the distance between the plate members 10 and is reduced. The contracting force has been previously described at the case in which the contracting force is applied to both the surfaces of the thermoelectric module 40.

Figure 16:
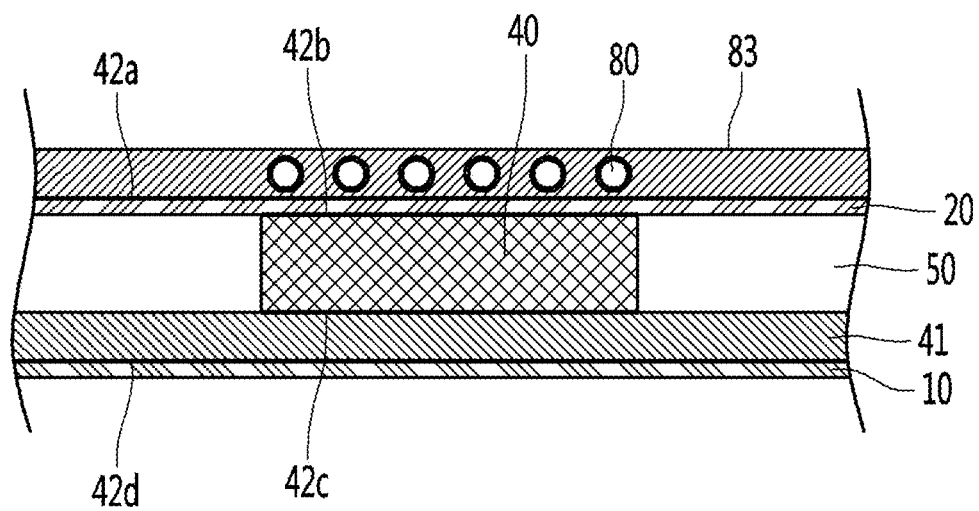
FIG. 16 is a cross-sectional view of the storehouse in which the thermoelectric module is disposed.

FIG. 16 is a cross-sectional view of the storehouse in which the thermoelectric module is disposed. A heat transfer path passing through the thermoelectric module will be described with reference to FIG. 16.

Referring to FIG. 16, the heat diffusion block 41 is disposed on the outer surface of the first plate member 10. The thermoelectric module 40 is disposed at an approximately central point on the outer surface of the heat diffusion block 41. The inner surface of the second plate member 20 comes into contact with the outer surface of the thermoelectric module 40. The heatsink 83 is disposed on the outer surface of the second plate member 20.

As described above, the vacuum space part 50 is in a vacuum state that is close to almost zero. Thus, large contracting force may be applied between the plate members. The heat diffusion block 41 and the second plate member 20, which come into contact with the inner and outer surfaces of the thermoelectric module 40, perform heat transfer through conduction. Thus, when the contact interfaces are spaced apart from each other to generate a gap, the thermal conduction is not performed, and since the gap is disposed in the vacuum space part 50, convection action through the gap is not generated, and only heat transfer by the radiation occurs. It may be expected that the heat transfer by the radiation will be extremely small. Thus, it is important that the contact interface is in perfect contact.

In this point, the contracting force between the plate members 10 and 20 due to the vacuum pressure of the vacuum space part 50 may promote the surface contact between the thermoelectric module 40 and the heat diffusion block 41 and the surface contact between the thermoelectric module 40 and the second plate member 20 to improve the heat conduction. In addition, the thermal interface modules 42*b*, 42*c*, and 43*d* may be intervened into the contact surface between the thermoelectric module 40 and the heat diffusion block 41, the contact surface between the thermoelectric module 40 and the second plate member 20, and the contact surface between the thermoelectric block 41 and the first plate member 10 to more improve the heat conduction.

Here, the used thermal interface may be made of a metal material such as indium or lead. Thus, an effect of the outgassing may be minimized in the vacuum space part 50.

Alternatively, the thermal interface module 42*a* used on the contact surface between the heatsink 83 and the second plate member 20 may use heat grease. This is done because the contact surface is outside the vacuum space part 50, and thus, there is no influence of the outgassing.

Figure 17:
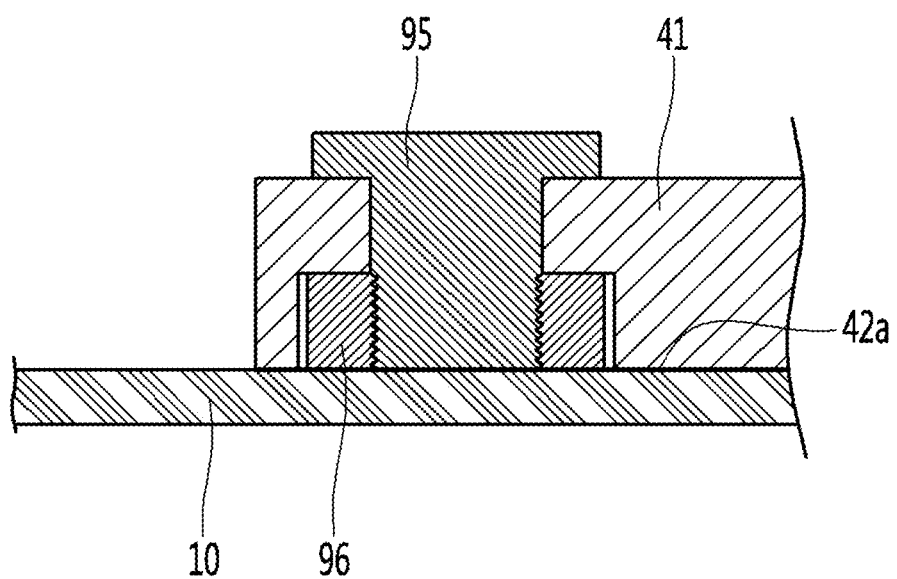
FIG. 17 is a view for explaining coupling of a heat diffusion block and a first plate member.

FIG. 17 is a view for explaining the coupling of the heat diffusion block and the first plate member.

As described above, quality of the contact surface between the members is one factor that determines the heat conduction performance. Thus, it is preferable that the coupling between the heat diffusion block 41 and the first plate member 10 is performed by using the bolt and the nut to secure strong coupling force.

Referring to FIG. 17, the nut 96 is coupled to the first plate member 10 through a method such as welding. A hole having a large head part may be provided in the heat diffusion block 41, and the nut 96 is disposed on the head part. Thereafter, the bolt 95 is coupled to pass through the hole and the nut 96. The bolt 95 and the nut 96 may be coupled to each other at about 4 to 6 positions in the entire heat diffusion block 41. The thermal interface module 42*a* made of a metal material may be inserted into the contact surface between the heat diffusion block 41 and the first plate member 10.

Figure 18:
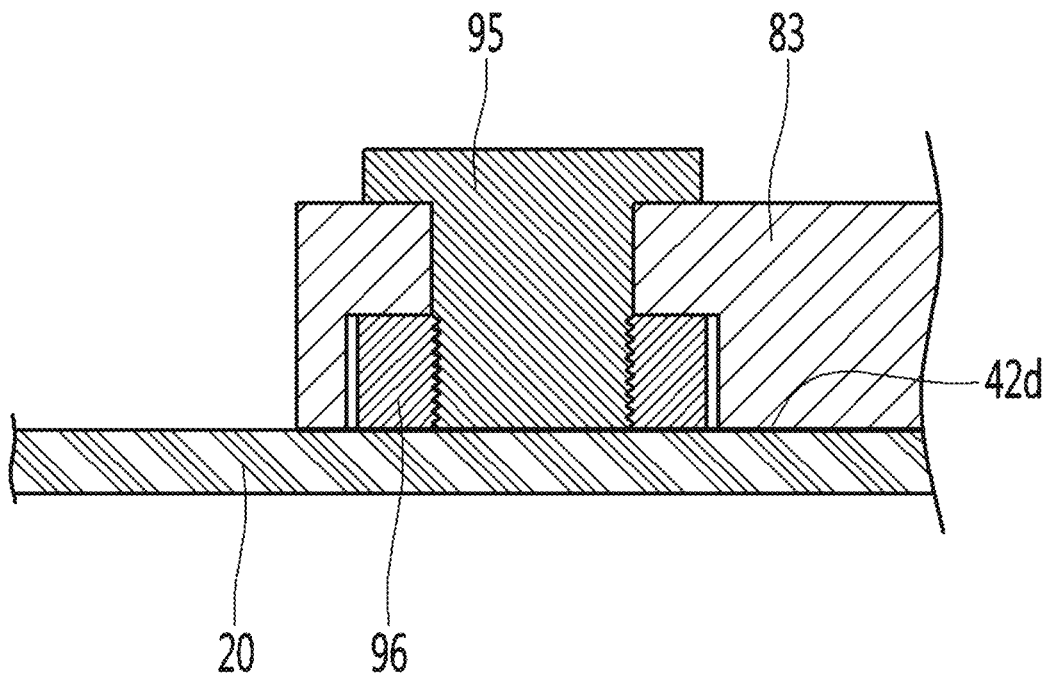
FIG. 18 is a view for explaining coupling of a second plate member and a heatsink.

FIG. 18 is a view for explaining the coupling of the second plate member and the heatsink.

As described above, quality of the contact surface between the members determines the heat conduction performance. Thus, it is preferable that the coupling between the heatsink 83 and the second plate member 20 is performed by using the bolt and the nut to secure strong coupling force.

Referring to FIG. 18, the nut 96 is coupled to the second plate member 20 through a method such as welding. A hole having a large head part may be provided in the heatsink 83, and the nut 96 is disposed on the head part. Thereafter, the bolt 95 is coupled to pass through the hole and the nut 96. The bolt 95 and the nut 96 may be coupled to each other at about 6 to 10 positions in the entire heatsink 83. The liquid thermal interface module using the heat grease may be inserted into the contact surface between the heatsink 83 and the second plate member 20.

Figure 19:
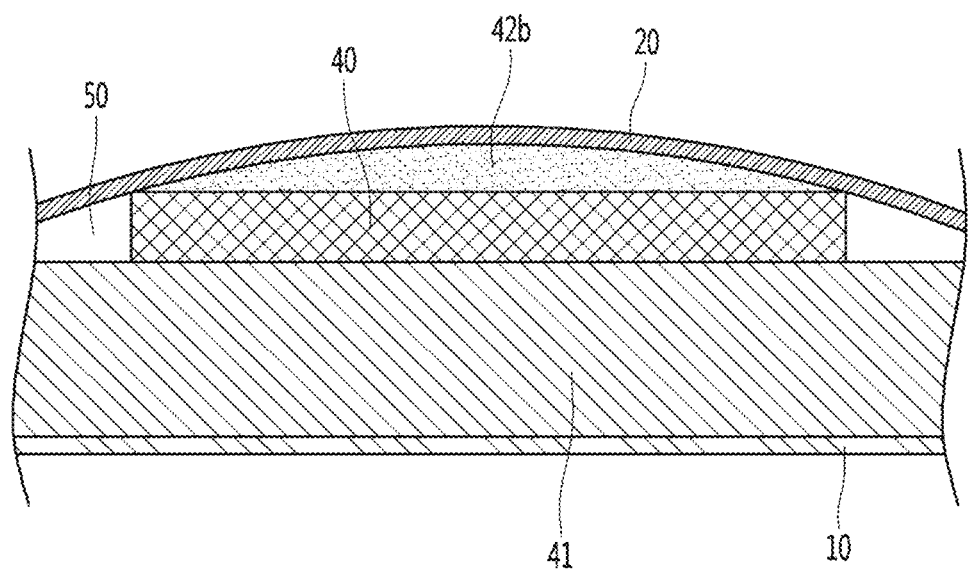
FIG. 19 is an enlarged view of a contact surface between the heat diffusion block and the second plate member.

FIG. 19 is an enlarged view of the contact surface between the heat diffusion block and the second plate member.

Referring to FIG. 19, the second plate member 20 is provided as a thin plate, and the thermoelectric module 40 is made of ceramic. When the contracting force due to the vacuum space part 50 is applied to the second plate member 20, the second plate member 20 may come into line contact at an edge portion of the thermoelectric module 40, and the second plate and the thermoelectric module 40 may be spaced apart from each other at a central portion of the thermoelectric module 40. Thus, the distance between the bars 31 provided on the supporting unit 35 may be adjusted to implement various structures. That is to say, when the distance between the edge portion and the bar increases, the spaced distance may more increase. In this case, the heat conduction performance may be deteriorated.

To solve this problem, the thermal interface module 42B is made of indium or lead.

The indium has a melting point of 156 degrees, i.e., a low melting point. Thus, after a set value of the degree of vacuum of the vacuum space part 50 is applied, the thermal interface module 42 made of the indium may be heated to fill the thermal interface module 42b into the spaced portion between the second plate and the thermoelectric module 40 at the central portion of the thermoelectric module 40. In this case, the deterioration in heat conduction performance may be prevented.

Although the lead has a melting point of 327 degrees, the lead has a soft property. Thus, when the set value of the degree of vacuum of the vacuum space part 50 is applied to cause deformation of the second plate member 20, the thermal interface module 42 made of the lead may be filled into the spaced portion between the second plate and the thermoelectric module 40 at the central portion of the thermoelectric module 40. In this case, the deterioration in heat conduction performance may also be prevented.

The same structure may also be applied to the contact surface between the heat diffusion block 41 and the thermoelectric module 40 to obtain the improvement of the heat conduction performance with respect to the contact surface.

A constituent for applying power to the thermoelectric module will be described with reference to FIGS. 20 and 21.

Figure 20:
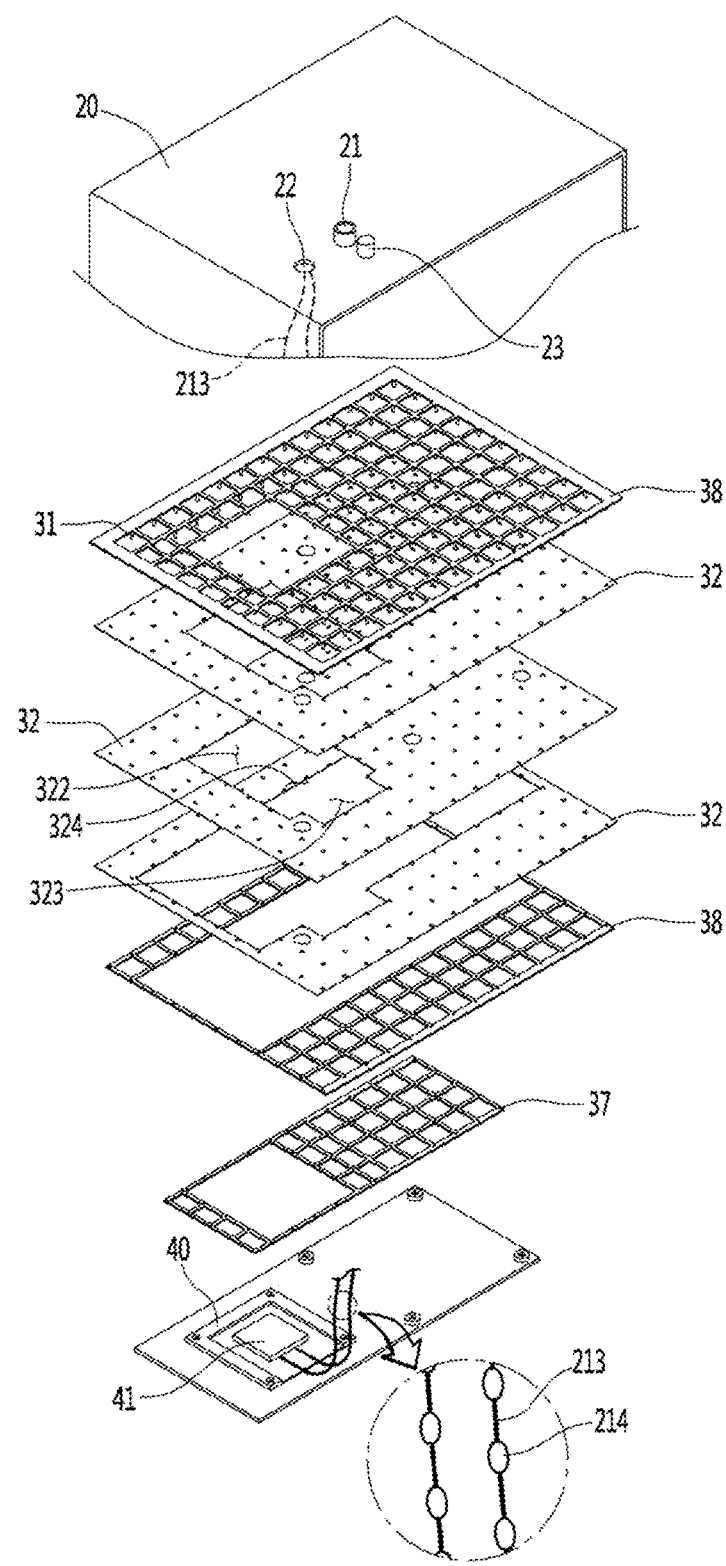
FIG. 20 is an exploded perspective view illustrating a peripheral portion of the thermoelectric module.

FIG. 20 is an exploded perspective view illustrating a peripheral portion of the thermoelectric module.

Referring to FIG. 20, at least two or more sheets of radiation resistance sheets 32 inserted into the support plates at a predetermined interval are disposed on the supporting unit 30. The radiation resistance sheets 32 may be supported at a predetermined interval by the bar 31 connecting the support plates 35 to each other. Here, a spacer may be disposed between the radiation resistance sheets 32. Although not shown, the spacer may be disposed between the radiation resistance sheets to prevent the radiation resistance sheets from coming into contact with each other.

The supporting unit 30 may not be provided on the place on which the thermoelectric module 40 is disposed, and the thermoelectric module 40 and the heat diffusion block 41 may come into direct contact with the plate members 10 and 20.

In order to apply power to the thermoelectric module 40, a pair of wires may extend from the power source hole 22 to the thermoelectric module 40. The pair of wires 213 may be provided in a stripped state as much as possible in order to reduce the outgassing.

A protrusion sheath 214 made of a resin material may be provided to prevent the pair of wires 213 from being short-circuited with each other when being bent and prevent the components within the vacuum space part from coming into contact with each other may be provided on each of the pair of wires 213. The adjacent components, for example, the pair of wires may be provided at a predetermined interval by the protrusion sheath 214. Here, a portion on which the protrusion sheath 214 may not be provided, i.e., only a conducting wire made of, for example, a copper material may be bent to provide a predetermined bending part.

The protrusion sheath 214 may be made of a material having low outgassing such as a material forming the supporting unit 30. For example, polycarbonate (PC), glass fiber PC, low outgassing PC, polyphenylene sulfide (PPS), and liquid crystal polymer (LCP) may be used as the material of the protrusion sheath. More preferably, the PPS such as the material forming the supporting unit may be used. When the sheath is generally made of a material having low outgassing such as polycarbonate (PC), glass fiber PC, low outgassing PC, polyphenylene sulfide (PPS), and liquid crystal polymer (LCP), the sheath may be entirely provided. However, since a general wire sheath is made of a plastic chloride resin, the sheath may have the form of the protrusion sheath without covering the entire conducting wire.

In order to prevent the wire 213 from being short-circuit on the path through which the wire 213 passes, a predetermined area of the entire area of the radiation resistance sheet 32 may be cut. Particularly, the radiation resistance sheet 32 may be cut on the path through which the wire 213 passes to provide a wire guide part 324. The wire guide part 324 may be cut together with a thermoelectric module seating part 322 on which the thermoelectric module 40 is placed.

In order to form vacuum in the vacuum space part 50, exhaust may be performed through the exhaust port 21. A strong flow rate may be generated in the exhaust port 21 at the beginning of the air discharge process. In order to prevent the radiation resistance sheets 32 from being deformed and coming into contact with each other by the strong flow rate, a position of the radiation resistance sheet 32 corresponding to the exhaust port 21 may be cut to provide an exhaust port seating part 323. The exhaust port seating part 323 may be cut together with the wire guide part 324.

Figure 21:
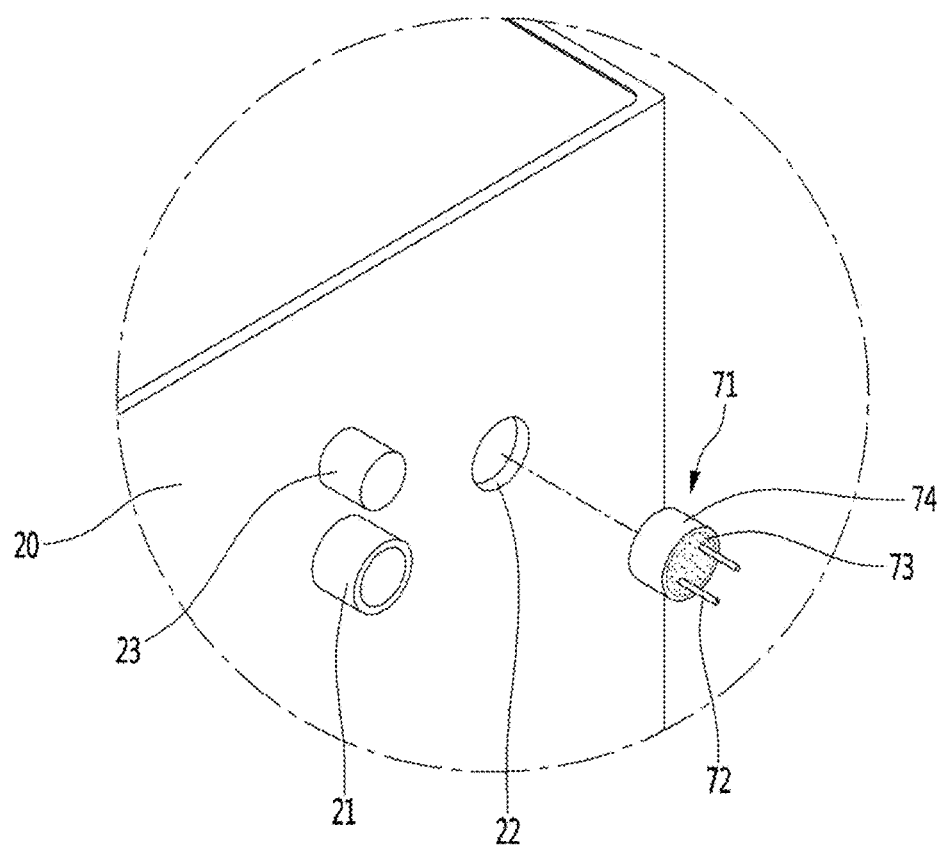
FIG. 21 is a view for explaining an operation of a sealing terminal that blocks a power source hole.

FIG. 21 is a view for explaining an operation of a sealing terminal that blocks the power source hole.

Referring to FIG. 21, a sealing frame 74 having, for example, a cylindrical shape may be provided on the sealing terminal 71. The sealing frame 74 may have a shape that is similar to that of the power source hole 22. Two power terminals may pass through a center of the sealing frame 74. A gap between the power terminal 72 and the sealing frame 74 may be sealed with an encapsulating member 73. The encapsulating member 73 may be made of a glass material.

The power terminal 72 may be inserted into the power source hole 22, and thus, one end of the power terminal 72 may be connected to the wire 213. The other end of the power terminal 72 may be connected to an external power source. The sealing frame 74 may cover the power source hole 22 to weld the sealing frame 74 with the second plate member 20, thereby sealing the gap between the members.

Figure 22:
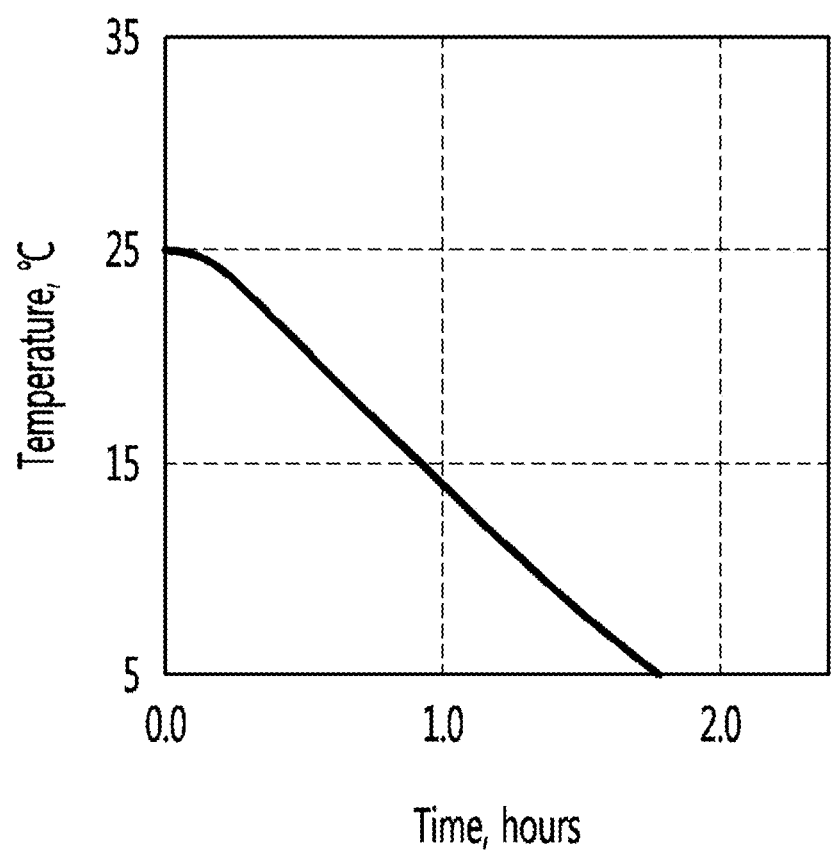
FIG. 22 is a graph illustrating results obtained through experiment on cooling performance of the storehouse according to an embodiment.

FIG. 22 is a graph illustrating experimental results of the storehouse according to an embodiment.

Referring to FIG. 22, the vacuum space part 50 has a distance of 10 mm, the storehouse has an internal capacity of 11 liters, N49 of LG Innotek is used as the thermoelectric module 40, and 50 W of power is applied, and 500 cc of beverage is provided inside the storehouse.

The above-described configuration may be provided to measure a time taken to decrease from 25 degrees to 15 degrees. As a result, it was 0.9 hours. In addition, after that, it was confirmed that the temperature drops below zero to reach a temperature of minus 19° C.

In the above embodiment, the case in which the storehouse is used as the refrigerator has been mainly described. However, it may be easily expected that a direction of the current supplied to the thermoelectric module 40 is switched so that the storehouse 200 is used as a warm cabinet.

INDUSTRIAL APPLICABILITY

According to the present invention, the storehouse may be provided to the vacuum insulator by using the thermoelectric module. Furthermore, the storehouse that is adequate for the vehicle may be provided. Therefore, the consumer's needs may be further improved, and industrial application is highly expected.

The invention claimed is:

1. An insulated storage comprising:
a first plate defining at least a portion of a wall for a first space, and the first space having a first temperature;
a second plate defining at least a portion of a wall for a second space, and the second space having a second temperature that is different from the first temperature of the first space;
a vacuum space provided between the first plate and the second plate to define a third space that has a temperature between the first temperature and the second temperature; and
a heatsink provided over the second plate,
wherein the vacuum space includes therein:
a supporting structure provided to maintain a volume of the third space;
a heat resistance unit provided to reduce heat transfer between the first plate and the second plate;
a heat diffusion block provided over the first plate; and
a thermoelectric module in contact with the heat diffusion block to perform heat exchange with the heat diffusion block.

2. The insulated storage of claim 1, wherein the heat diffusion block contacts the first plate, the thermoelectric module contacts the second plate, and the heatsink contacts the second plate.

3. The insulated storage of claim 2, further comprising:
a nut coupled to a surface of the first plate; and
a bolt intervened into the heat diffusion block and coupled to the nut.

4. The insulated storage of claim 2, further comprising:
a nut coupled to a surface of the second plate;
a bolt intervened into the heatsink and coupled to the nut; and
a thermal interface module intervened into a contact area between the heatsink and the second plate.

5. The insulated storage of claim 1, wherein a thermal interface module is intervened into at least one of a surface of the thermoelectric module and a surface of the heat diffusion block.

6. The insulated storage of claim 5, wherein the thermal interface module is made of a metal material.

7. The insulated storage of claim 6, wherein the metal material comprises indium or lead.

8. The insulated storage of claim 1, further comprising a wire applying power to the thermoelectric module,
wherein the supporting structure comprises a bar provided between the first plate and the second plate; and
at least one radiation resistance sheet supported by the bar, and
the radiation resistance sheet comprises a wire guide opening to provide a path through which the wire passes.

9. The insulated storage of claim 8, wherein the wire guide opening is integrated with a thermoelectric seating opening corresponding to a position of the thermoelectric module and an exhaust port seating opening corresponding to a position of an exhaust port.

10. The insulated storage of claim 1, further comprising a wire applying power to the thermoelectric module,
wherein the wire comprises:
an inner conducting wire; and
a sheath covering at least a portion of an outside of the inner conducting wire.

11. The insulated storage of claim 10, wherein the supporting structure is made of resin material, and the resin material comprises at least one selected from the group consisting of polycarbonate (PC), glass fiber PC, low outgassing PC, polyphenylene sulfide (PPS), and liquid crystal polymer (LCP).

12. The insulated storage of claim 10, wherein the sheath comprises protrusion sheaths spaced apart from each other to cover a portion of the inner conducting wire.

13. The insulated storage of claim 1, wherein a getter port is further provided in the second plate.

14. A storage compartment comprising:
a main body providing an internal space in which goods are stored, the main body including an opening to an external space; and
a door provided to open and close the opening, and at least one of the main body and the door includes a vacuum insulator, and
the vacuum insulator comprises:
a first plate defining at least a portion of a wall defining the internal space;
a second plate defining at least a portion of a wall defining the external space;
a sealing part sealing the first plate and the second plate to provide a vacuum space that has a temperature between a temperature of the internal space and a temperature of the external space, and the vacuum space being under vacuum pressure;
a supporting structure provided to maintain a volume of the vacuum space;
a thermoelectric module provided in the vacuum space and having a first surface and a second surface that have different temperatures, and the different temperatures provided by a thermoelectric effect;
a heat diffusion block having a third surface that is in contact with the first surface to perform heat exchange, and the heat diffusion block having a fourth surface to diffuse heat; and
a heatsink exchanging heat with the second surface of the thermoelectric module, and the heat sink provided in the external space,
the fourth surface of the heat diffusion block, which is not in contact with the thermoelectric module, having an area greater than that of each of the first surface and the second surface, and
the first and second surfaces of the thermoelectric module brought into contact with the heat diffusion block and the second plate, respectively, by the vacuum pressure of the vacuum space.

15. The storage compartment of claim 14, wherein a getter port is provided in the second plate.

16. A storage compartment for a vehicle, comprising:
a main body providing an internal space in which goods are stored, the main body including an opening to an external space; and
a door provided to open and close the opening;
at least one of the main body and the door includes a vacuum insulator, and
the vacuum insulator comprises:
a first plate defining at least a portion of a wall defining the internal space;
a second plate defining at least a portion of a wall defining the external space;
a sealing part sealing the first plate and the second plate to provide a vacuum space that has a temperature between a temperature of the internal space and a temperature of the external space, and the vacuum space being under vacuum pressure;

a supporting structure provided to maintain a volume of the vacuum space;

a heat resistance unit provided to reduce heat transfer between the first plate and the second plate;

a heat diffusion block provided in the vacuum space and coming into surface contact with the first plate;

a thermoelectric module provided in the vacuum space and coming into surface contact with the heat diffusion block and the second plate to perform heat exchange; and a heatsink that exchanges heat with the second plate and provided in the external space, and wherein at least one of the heat diffusion block and the heatsink is coupled to one of the first plate and the second plate using a bolt and a nut.

17. A vehicle in which the storage compartment of claim 16 is mounted, the vehicle comprising a fitting connecting the main body to the vehicle, and the fitting provided to position the main body on the vehicle.

\* \* \* \* \*